(No Model.) 2 Sheets—Sheet 1.
A. CARSTENS.
COMBINED HORSESHOE NAIL AND CALK.
No. 412,728. Patented Oct. 15, 1889.
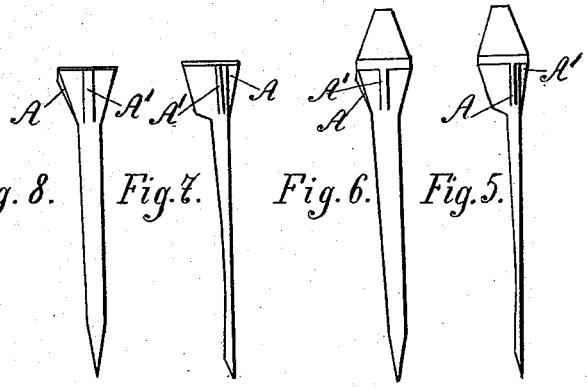
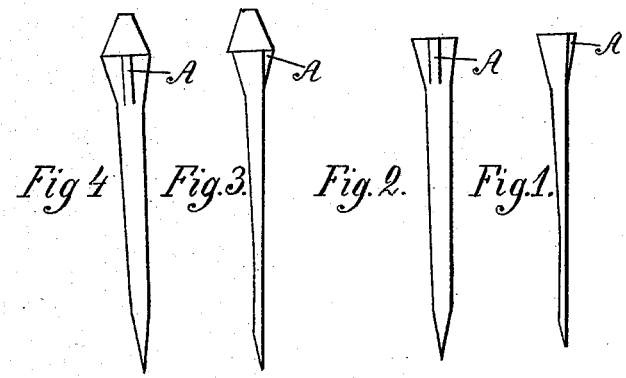
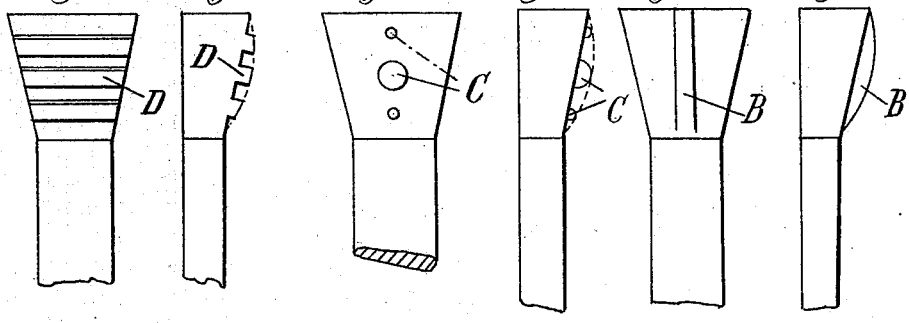
Witnesses
Joseph Purath.
Wilhelm Binderwald
Inventor:
Asmus Carstens.
by:
Att'ies.

(No Model.) 2 Sheets—Sheet 2.
A. CARSTENS.
COMBINED HORSESHOE NAIL AND CALK.
No. 412,728. Patented Oct. 15, 1889.
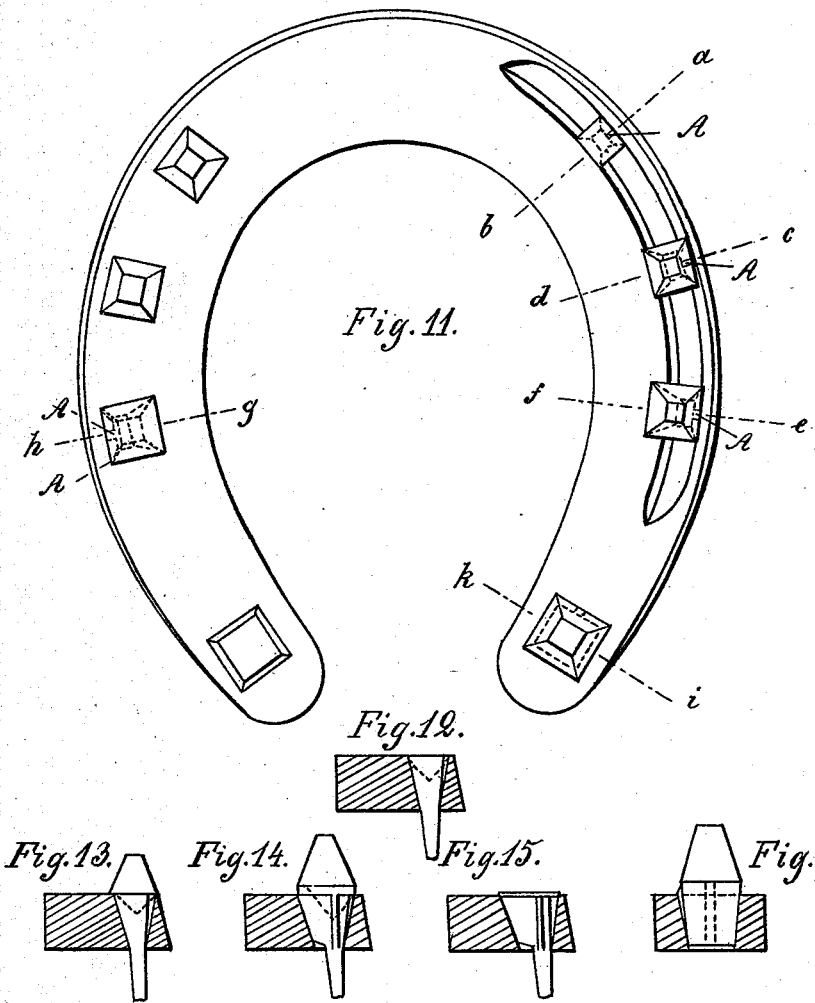
Witnesses:
Joseph Purath.
Wilhelm Binderwald
Inventor:
Asmus Carstens
by
Att'ies.

UNITED STATES PATENT OFFICE.

ASMUS CARSTENS, OF FLENSBURG, PRUSSIA, GERMANY.

COMBINED HORSESHOE NAIL AND CALK.

SPECIFICATION forming part of Letters Patent No. 412,728, dated October 15, 1889.

Application filed July 11, 1888. Serial No. 279,604. (No model.) Patented in Germany November 29, 1887, No. 44,297; in Norway June 5, 1888, No. 924; in England June 6, 1888, No. 8,294; in Sweden June 7, 1888, No. 1,565; in Canada September 11, 1888, No. 29,928, and in Denmark November 28, 1888, No. 967.

*To all whom it may concern:*

Be it known that I, ASMUS CARSTENS, of Flensburg, in the Kingdom of Prussia, German Empire, have invented a new and useful Improvement in Horseshoe Nails and Calks, (for which I have obtained patents in Germany, No. 44,297, dated November 29, 1877; in Great Britain, No. 8,294, dated June 6, 1888; in Denmark, No. 967, dated November 28, 1888; in Sweden, No. 1,565, dated June 7, 1888; in Norway, No. 924, dated June 5, 1888, and in Canada, No. 29,928, dated September 11, 1888,) of which the following is a specification.

My invention relates to improvements in horseshoe nails and calks.

Figures 1 and 2 show in front and side elevation a horseshoe-nail made according to my present improvements, provided at one side of the head with a rib. Figs. 3 and 4 show a front and side view of a calk or frost-nail for horseshoes according to my invention, provided with a rib. Figs. 5 and 6 show a side and front view of a thicker nail, also provided with two projecting ribs on my new plan. Figs. 7 and 8 show a side and front view of an improved nail with two ribs, like Figs. 5 and 6, but without a projecting head. Figs. 9 and 10 show steel-pin calks with two ribs and a hardened head. Fig. 11 shows a horseshoe in which the nails shown in Figs. 1 to 10 are used. Fig. 12 shows a cross-section from *a* to *b* of Fig. 11, and a nail, like Figs. 1 and 2, driven in the horseshoe, Fig. 11. Fig. 13 shows a section from *c* to *d* of Fig. 11, and also a nail, like Figs. 3 and 4, in the horseshoe. Fig. 14 is a section through Fig. 11 on line *e* to *f*, and shows the nail of Figs. 5 and 6 in connection with the horseshoe, Fig. 11. Fig. 15 shows a section from *g* to *h*, Fig. 11, and a nail without head, like Figs. 7 and 8, in connection with the horseshoe. Fig. 16 is a section on line *i* to *k*, Fig. 11, and shows the pin calks or nails, Figs. 9 and 10, in connection with the horseshoe. Figs. 17 and 18 show a side and front view of an altered form of the rib on the nail-head, consisting of a slight arching thereof. Figs. 19 and 20 show the substitution for the ribs on the heads of the horseshoe-nails of shoulders cast on in the form of the section of a half-sphere, Fig. 19 being a side view, and Fig. 20 a front view. Lastly, Figs. 21 and 22 show another position of the ribs at the head, being placed parallel to the surface of the horseshoe, Fig. 21 being a side view, and Fig. 22 a front view.

As the holes of the horseshoe, whether made by hand or by machinery, are never quite equal, and in straightening the horseshoe they easily get somewhat displaced or altered in shape, and as it is impossible for every one of the ordinary horseshoe-nails to grasp absolutely firm onto the hole, the horseshoe gets loose on the hoof, and the hoof itself suffers greatly. Now, horseshoe-nails with ribs at the head made in accordance with my present invention are designed to remove this evil. The horseshoe-nails are, as already mentioned, provided with one or two projecting ribs at the head, which ribs, when the nail is driven into the hoof in nailing on the horseshoe, or when the shod animal steps onto hard roads, fill up the inequalities of the holes and under all circumstances fit tightly into the hole of the horseshoe. The projecting rib or ribs work in this way, so that when the nail is driven in they yield, spread out, and thus fill up or partly fill up the holes in the horseshoes in such a way that the nails rest properly in the holes on all four sides. Thus the shoe is firmly attached to the hoof, and the hoof, too, is spared. In Figs. 1 and 2 a horseshoe-nail with a projecting rib A is shown, which nail may be used instead of the ordinary nail for flat shoeing.

Figs. 11 and 12 show the horseshoe-nail, Figs. 1 and 2, in connection with the shoe. The projecting rib A is placed on one side of the four-cornered wedge-shaped head and increases in height toward the base of the head, so that it slightly increases the width of the head.

Figs. 3 and 4 show a calk or frost-nail with a projecting rib A. Figs. 5 and 6 show a thicker nail or calk, with two projecting ribs A and A'. The nail, Figs. 3 and 4, is made of soft steel and hardened at the projecting head part. It can be used without any alteration for any horseshoe which is not ground, and is especially suitable for riding or light cart-horses.

Figs. 5 and 6 show a thicker nail with two ribs, which, as the thick cone is avoided, fit absolutely tight in the hole of the horseshoe. It is made of soft steel with a hardened head. In order to be able to use this nail, however, the holes of the horseshoe must be widened.

Figs. 7 and 8 show a nail, like Figs. 5 and 6, with two ribs A A', but without head.

Fig. 13 shows the nail represented in Figs. 3 and 4 in the horseshoe.

Figs. 14 and 15 show the arrangement of the nails, Figs. 5 to 8, in the horseshoe.

Figs. 9, 10, and 16 show a steel-pin calk or nail with two ribs and a hardened head. These pin-calks with ribs are driven in the usual four-sided nine holes, as shown in Fig. 16.

The form of the ribs on the head part of the horseshoe-nails, as shown in Figs. 1 to 16, may be altered by giving the ribs an arched instead of a straight outline, and instead of a wedge shape that of a projecting pad. Such ribs B, Figs. 17 and 18, only touch the hole with one point, and therefore spread out better than the wedge-shaped ribs and form a better support for the nail-head in the hole. The ribs B, Figs. 17 and 18, can also be replaced, as in Figs. 19 and 20, by semi-spherical or conical or other shaped shoulders C on the nail-head, the outer points thereof lying in a straight line or a circular curve. Lastly, the ribs, as in Figs. 1 to 18, or elevations, as in Figs. 19 and 20, may also be placed obliquely to the length of the nail instead of in the transverse direction thereof, (see the ribs $d$, Figs. 21 and 22,) so that the nail-head may enter the hole with several such oblique ribs simultaneously.

What I claim, and desire to secure by Letters Patent of the United States, is—

A horseshoe-nail having, as usual, a tapered head to fit a corresponding socket in the shoe, said head having on its front surface ribs or ball-shaped projections integral with the face of the nail-head, arranged in a curved line, so that the head may be wedged into its socket, and having also integral therewith a tapered calk, substantially as shown and described.

In witness whereof I have hereunto set my hand in presence of two witnesses.

ASMUS CARSTENS.

Witnesses:
W. BINCLEWALD,
B. ROI.